Sept. 7, 1965  G. H. JONES ETAL  3,204,490
POWER INDEXING MECHANISM FOR MACHINE TOOLS
Filed July 31, 1962  5 Sheets-Sheet 1

INVENTORS.
GORDON H. JONES
EVERETT E. HOSEA
BY
Wolfe, Hubbard, Voit & Osann
ATTORNEYS.

INVENTORS.
GORDON H. JONES
EVERETT E. HOSEA
BY
Wolfe, Hubbard, Voit & Osann
ATTORNEYS.

INVENTORS.
GORDON H. JONES
EVERETT E. HOSEA
BY Wolfe, Hubbard, Voit & Osann
ATTORNEYS.

INVENTORS.
GORDON H. JONES
EVERETT E. HOSEA
BY Wolfe, Hubbard, Voit & Osann

ATTORNEYS.

INVENTORS.
GORDON H. JONES
EVERETT E. HOSEA
BY Wolfe, Hubbard, Voit & Osann
ATTORNEYS.

United States Patent Office 3,204,490
Patented Sept. 7, 1965

3,204,490
POWER INDEXING MECHANISM FOR
MACHINE TOOLS
Gordon H. Jones and Everett E. Hosea, Fond du Lac,
Wis., assignors to Giddings & Lewis Machine Tool
Company, Fond du Lac, Wis., a corporation of
Wisconsin
Filed July 31, 1962, Ser. No. 213,757
3 Claims. (Cl. 74—822)

This invention relates to tool holding turrets for machine tools and more particularly concerns power operated indexing mechanisms for the side or auxiliary turrets of such machine tools.

Many machine tools, such as vertical boring mills, turret lathes and similar devices have power operating mechanisms for positioning or indexing the main tool holding turret. One example of a turret mechanism of this type is shown in U.S. Patent No. 2,936,656, issued May 17, 1960.

In addition to the main turret, machine tools of this class often include side and auxiliary turrets. The side turret is usually mounted at the end of a horizontal ram which is axially movable toward and away from the work table. Due to the relatively small side of such turrets and their supporting rams, the power mechanism used for indexing the larger main turret is not suitable for operating these side turrets. Moreover, it is also necessary to contain the entire actuating mechanism of the side turret within the confines provided by the external ram surfaces without, however, materially reducing the strength or stability of the ram unit. Similar size limitations are encountered when attempting to provide a power indexed auxiliary turret, such turrets being often mounted on vertical rams in the larger vertical turret lathes.

Accordingly, the primary aim of the present invention is to provide a power indexing mechanism for a turret of a machine tool which employs a hydraulic rotary actuator that is directly coupled to the turret and is completely enclosed within the end portion of a slender, turret carrying ram body.

It is a more particular object of the invention to provide a novel actuator for a mechanism of the above type which is practically maintenance free and capable of reliable operation even under the long, heavy-duty use normally associated with machine tools.

A collateral object is to provide an actuator of the above character which affords a built-in safety feature in that the rapid, virtually positive drive of the actuator is immediately interrupted should the turret or a tool supported thereby strike an obstruction.

It is a further object to provide a power indexing mechanism as described above which is economical to manufacture and simple to maintain and install, due to the straight forward arrangement of the individual components.

It is an additional object to provide such an indexing mechanism in which the turret head is easily separable from the indexing and locking mechanism to allow rapid and convenient replacement and interchanging of turret heads, which may carry accurately pre-positioned tools.

Other objects and advantages of the invention will become apparent on reading the following detailed description and upon reference to the drawings, in which:

FIG. 3 is a rear elevation as seen from the line 3—3 in FIG. 2a;

FIG. 4 is a section taken substantially along the line 4—4 in FIG. 2a;

FIG. 5 is a section taken substantially along the line 5—5 in FIG. 2a;

FIG. 6 is a section taken along the line 6—6 in FIG. 2a;

FIG. 7 is a section taken substantially along the line 7—7 in FIG. 2a; and

FIG. 8 is a section taken along the line 8—8 in FIG. 2a.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
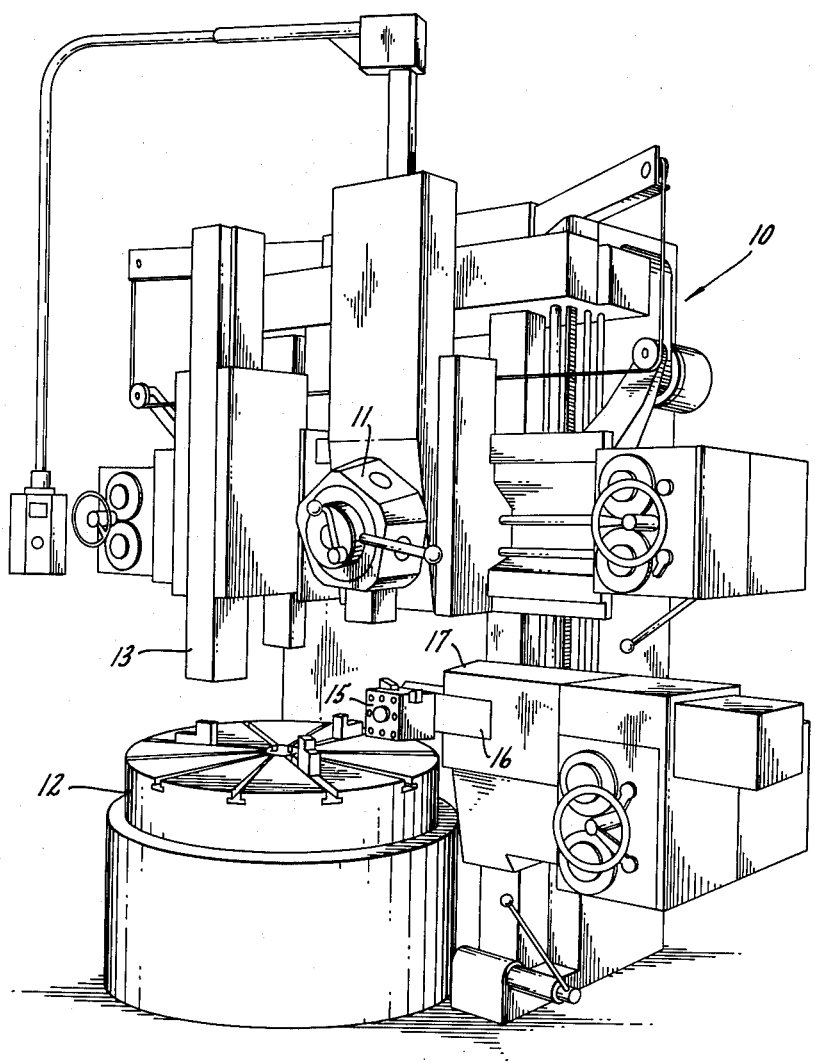
FIGURE 1 is a perspective view of a machine tool utilizing structure embodying the present invention.

Turning first to FIG. 1 there is shown a machine tool 10 which those skilled in the art will recognize as a vertical turret lathe and which includes a main indexable turret 11 mounted above a rotatably-driven, work-supporting table 12. A vertical ram 13 is disposed adjacent the main turret 11 for mounting an auxiliary turret if desired. The tool 10 also includes a side turret 15 which is rotatably mounted on a ram 16 that reciprocates in a frame or head 17 forming part of the main frame of the tool 10. The power indexing mechanism for positioning the side turret 15 embodies the present invention.

In the illustrated embodiment, the side turret 15 is mounted on the side wall of the ram 16 and the ram is completely surrounded by the structure which comprises the supporting head 17. Preferably, the ram 16 is a single solid structure having a hollow center core 18 (see FIGURES 2a and 2b). The turret is mounted on a shaft 21 that passes through an opening 22 so that the shaft extends into the hollow core 18. The shaft 21 is journaled in a cap 23 that is secured by a plurality of bolts 24 to the side of the ram 16 so as to close the opening 22.

In accordance with the present invention, a rotary hydraulic actuator 30 is enclosed within the end of the ram 16 and is directly coupled to the shaft 21 so as to rotatably index the turret 15. In the preferred embodiment, the rotary actuator 30 includes a drive shaft 31, disposed transversely to the longitudinal axis of the ram 16, which is alined with and directly coupled to the shaft 21 so as to permit limited axial movement of the shaft 21 relative to the actuator. As illustrated, the drive shaft 31 is splined into an enlarged end portion 32 of the turret shaft 21. The rotary actuator 30, which is generally cylindrical, is mounted in a circular opening 33 in the ram wall opposite the turret 15 and is secured to an integral flange 34 by a plurality of bolts 35, only one of which is shown.

The rotary actuator 30 includes a ring spacer 38 bolted between front and rear case elements 39 and 40, respectively, which define a fluid-tight chamber 41. The casing elements 39, 40 mount bearings 42, in which the drive shaft 31 is journaled, and ring seals 43 for hydraulically sealing the chamber 41. In order to drive the shaft 31, a vane 45 is keyed to the shaft and projects radially within the chamber 41 (see FIG. 8). The driving vane 45 does not carry the customary flexible seals, but rather is provided with running clearance within the chamber 41. Thus, the actuator 30 is directly coupled for positively rotating the turret 15, but if the turret should be blocked from rotation such as by a tool accidentally striking the work piece, the actuator will stall since the running clearance allows controlled hydraulic leakage around the vane 45. This clearance also has the advantage of minimizing internal wear and maintenance problems.

Figure 8:
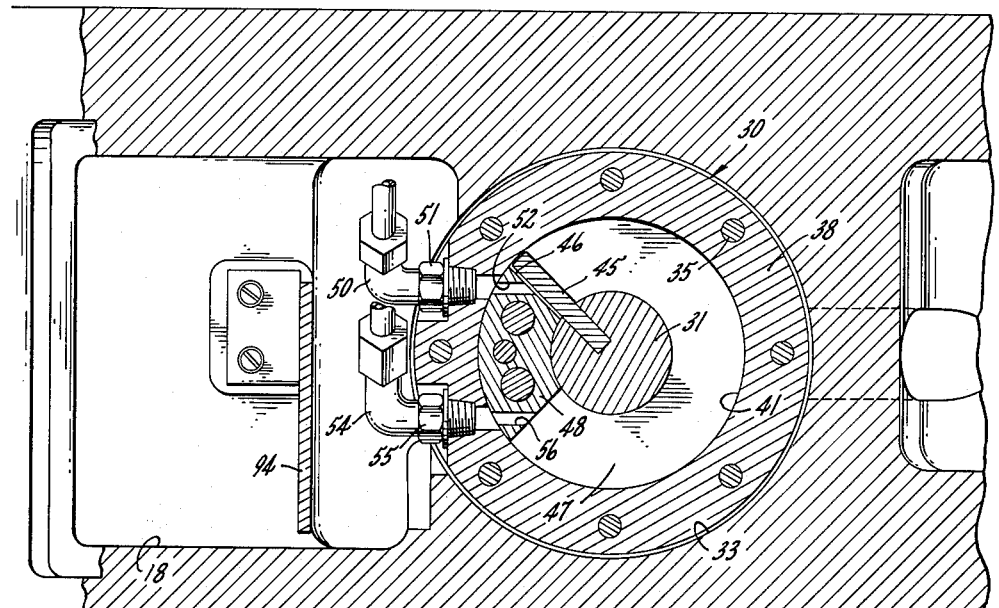

In order to drive the vane 45 in either direction, the chamber 41 is divided into separate hydraulic compartments 46 and 47 on either side of the vane by an internal structure 48 through which hydraulic fluid is admitted to the compartments. As best shown in FIG. 8, the internal structure 48 is in the form of a quadrant element closely fitted between the shaft 31 and the ring spacer 38. A hydraulic line 50 is coupled to the actuator 30 by an end fitting 51 for directing fluid under pressure through a restricted orifice 52 in the structure 48 and into the compartment 46 to drive the vane 45 in one direction. Similarly, a hydraulic line 54 having an end fitting 55 directs fluid under pressure through a restricted orifice 56 into the compartment 47 to drive the vane 45 in the other direction. By limiting the flow of pressure fluid, the restricted orifices 52, 56 serve to regulate the rotational speed of the actuator 30.

In the embodiment illustrated, the turret 15 has four angularly spaced positions arranged to alternately present four separate tools to a work piece on the table 12. For releasably clamping the turret 15 in its alternate positions, a pair of interlocking clamp rings 65 and 66 having opposed interfitting teeth are mounted on the turret 15 and the cap 23, respectively. The turret 15 is locked against axial movement on the shaft 21 and the shaft is axially shiftable so as to carry the clamp ring 65 away from the ring 66 and thus free the turret for rotation or, alternatively, to draw the clamp rings together so as to interfit their opposed teeth and thus lock the turret against rotation. This form of turret clamp is shown in the U.S. patent identified above.

The shaft 21 is axially shifted to control clamping of the turret 15 by a toggle ring 67 which acts in opposition to a plurality of biasing pins 68, of which only one pin is illustrated. The pins 68 are imbedded in the cap 23 and are resiliently urged so as to bear on the turret 15 and urge it away from the ram 16, thus tending to separate the clamp rings 65, 66. The toggle ring 67 is fitted against the enlarged portion 32 of the shaft 21 and is coupled by a plurality of links 70 (see FIG. 2a) to an annular base plate 71 which is fitted in the cap 23 and keyed thereto at 72 against rotation. Rotation of the ring 67 tends to straighten the links 70 into parallel relation to the shaft 21 thus tending to separate the toggle ring 67 from the base plate 71, with the result that the ring bears against the portion 32 and shifts the shaft 21 together with the turret 15 toward the ram 16 against the biasing force of the pins 68.

Figure 6:
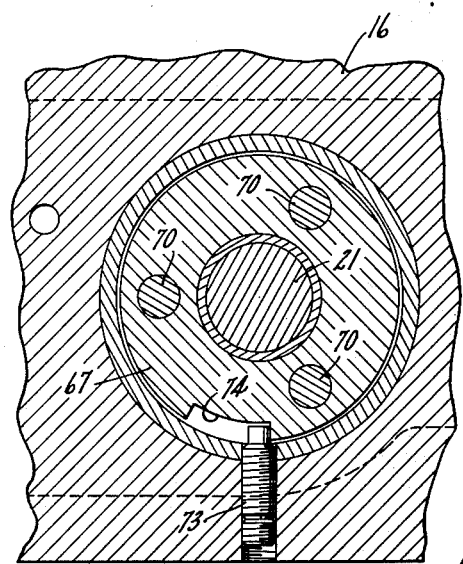

A stop 73 is anchored within the ram 16 and extends into an arcuate groove 74 formed in the periphery of the toggle ring 67 so as to define limit positions between which the toggle ring may be rotated (see FIG. 6). To equalize the force exerted by the toggle links 70, the base plate 71 is provided with a spherical load bearing surface that mates with a correspondingly formed surface on the cap 23. The base plate 71 may, therefore, rock slightly so that the forces exerted upon straightening the toggle links 70 are equalized about the axis of the shaft 21.

Figure 4:
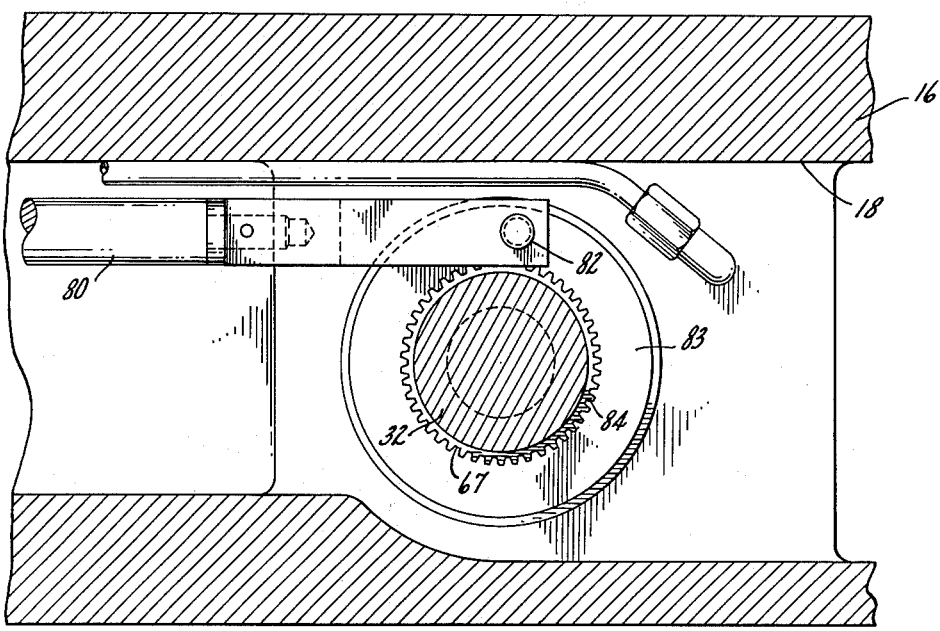

The turret 15 is clamped and unclamped by a clamp shaft 80 disposed axially of the ram 16 within the hollow center ram core 18. One end of the shaft 80 is pinned at 82 to a collar 83 that is splined at 84 to the toggle ring 67 (see FIG. 4). The other end of the shaft 80 is secured to the movable element of a linear hydraulic actuator 85. In the illustrated embodiment, the movable element is a piston 86 shiftably received in a cylinder 87 formed in an end block 88 mounted in the rear end of the hollow center core 18. A passage 89 provides hydraulic fluid to the cylinder 87 on one side of the piston 86 so as to drive a shaft 80 to the left in FIG. 2a and clamp the turret. A second passage 90 admits hydraulic fluid under pressure to the opposite side of the piston 86 so as to move the shaft toward the right, resulting in slight rotation of the toggle ring 67 so as to tilt the links 70 and allow the biasing pins 68 to unclamp the turret.

Figure 2A:
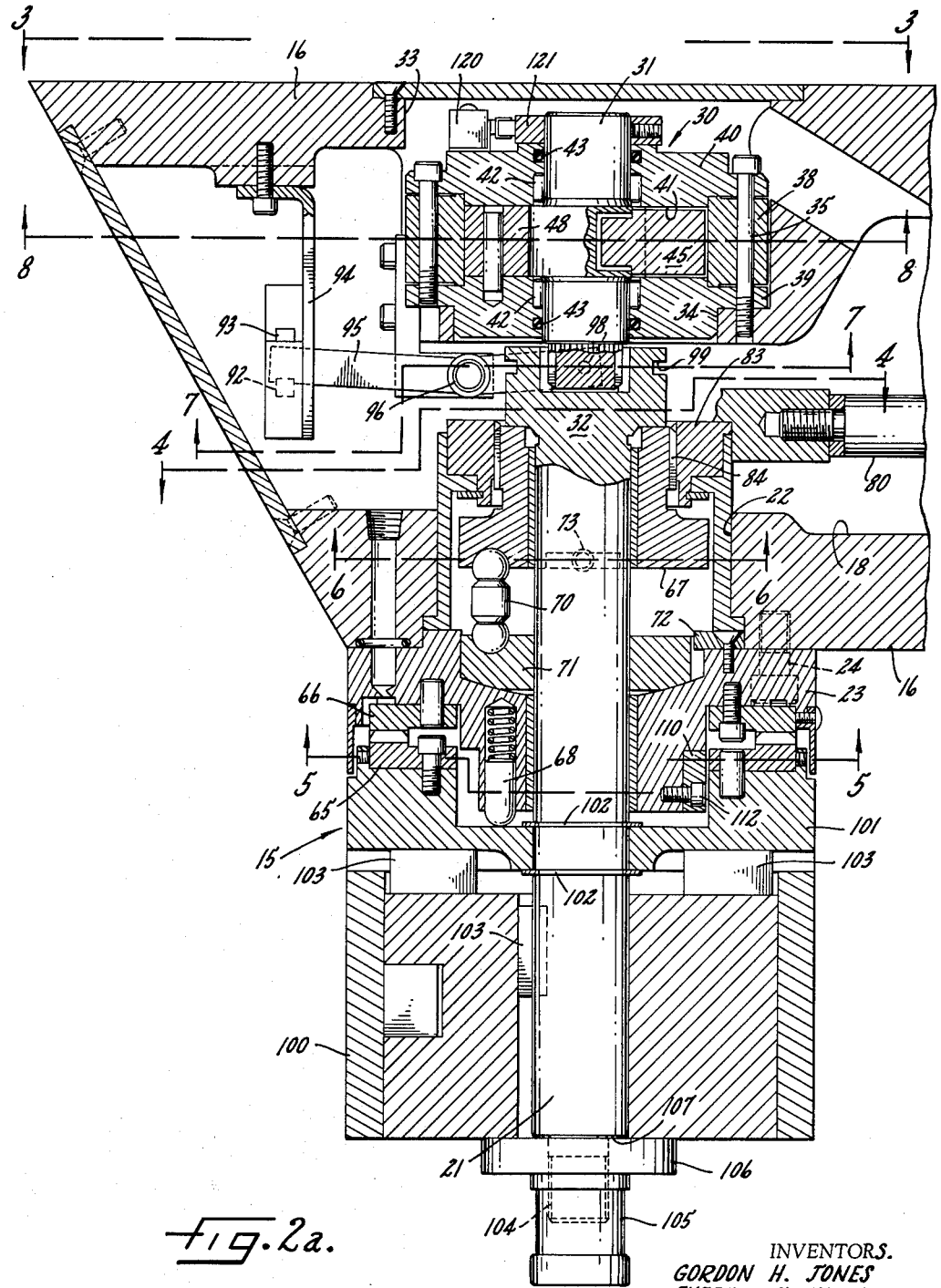
FIGS. 2a and 2b are fragmentary sectional views of the supporting ram and side turret of the machine tool shown in FIG. 1.
Figure 2B:
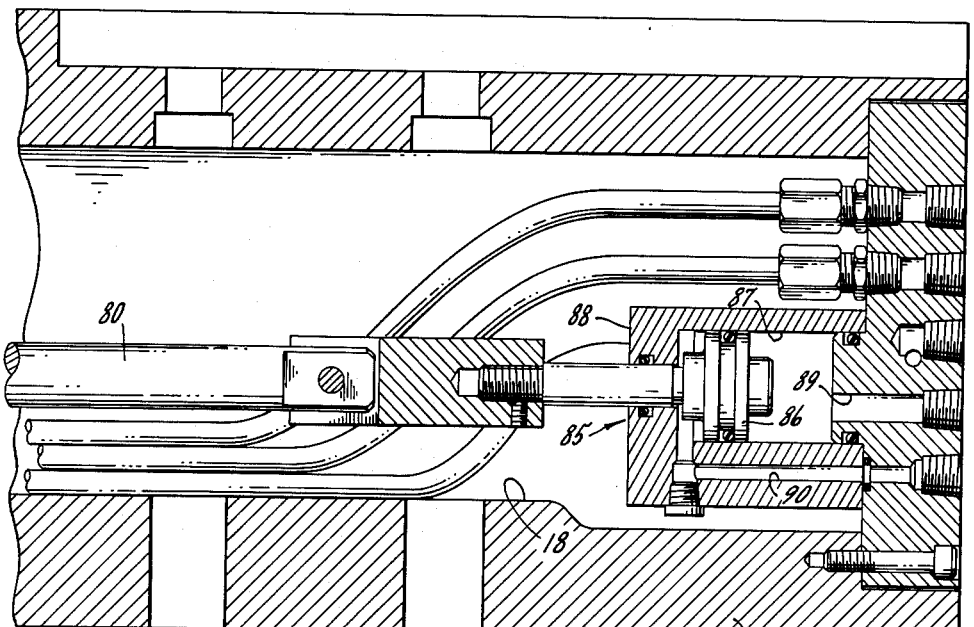
Figure 3:
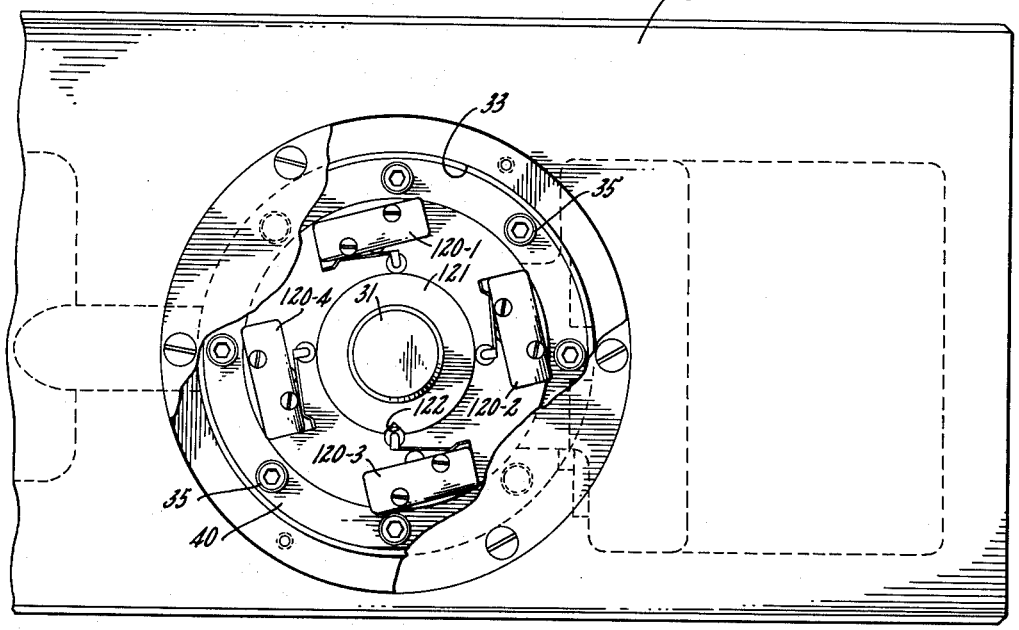
Figure 7:
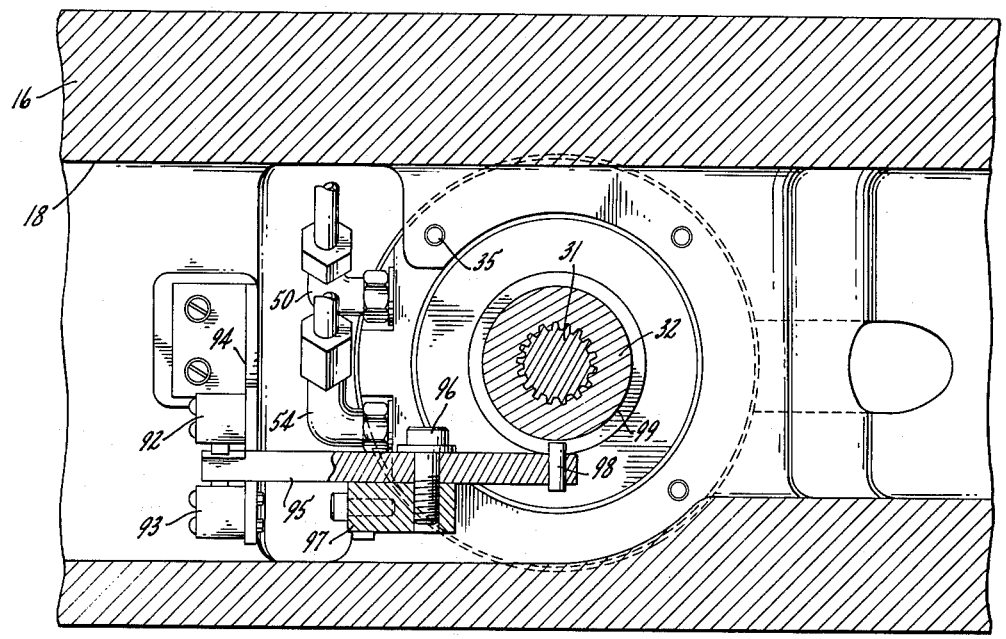

To sense whether the turret 15 is clamped or not, the automatic indexing mechanism includes a pair of switches 92 and 93 shown in FIG. 7, which are physically secured to a bracket 94 within the hollow core 18 (see also FIG. 2a). The switches are actuated by an arm 95 which is pivoted at 96 on a support 97 also secured to the inner wall of the hollow core 18. One end of the arm 95 carries a pin 98 which is received in an annular groove 99 formed in the portion 32 of the turret shaft 21. It can thus be seen that axial shifting movement of the shaft 21 results in swinging the arm 95 and operation of either the switch 92 or the switch 93.

Pursuant to another aspect of the invention, the turret 15 includes a detachable, tool-holding main portion or head 100 which is releasably mounted on a turret base 101 that is secured to the shaft 21 against axial movement by a pair of snap rings 102. The head 100 is slidably fitted on the shaft 21 and is keyed against rotation to both the shaft and the turret base 101 by key members 103. The shaft 21 is necked-down and threaded at the end 104 to receive a retaining nut 105 and a large retaining washer 106 is interposed between the nut 105 and the head 100 so that the washer abuts a shoulder 107 formed on the shaft 21 adjacent the threaded portion when the head is properly positioned. Thus, excessive tightening of the nut 105 simply presses the washer 106 against the shoulder 107 and the positions of the head 100 and the base 101 are completely uneffected.

It may be seen that by the removal of the single nut 105, the tool head 100 may be quickly and easily removed and replaced without disturbing the clamp rings 65, 66 or the actuator 30. This feature greatly facilitates interchanging tools since the tools may be accurately prepositioned on the head 100 prior to mounting the head on the base 101, thereby minimizing down-time of the machine tool 10.

Figure 5:
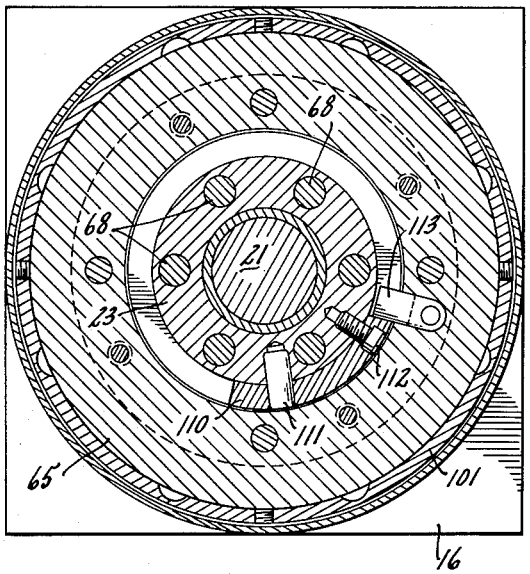

To prevent damage to the internal parts of the rotary actuator 30, a positive stop 110 is provided that limits rotation of the turret 15 in either direction and prevents the vane 45 from striking the structure 48. The stop 110, as seen in FIG. 5, is in the form of an arcuate blocking element which is secured to the cap 23 by a locating pin 111 and cap screw 112. A projecting tab 113 is received in a recess machined in the inner face of the turret base 101 and is extended inwardly toward the surface of the cap 23 so that the ends of the stop 110 limit movement of the tab 113 and thus of the turret 15. Preferably, the stop 110 and tab 113 are proportioned to define the rotational end positions of the turret 15 in either direction in which end positions the vane 45 is slightly spaced from the structure 48. Therefore, external torque on the shaft 21 or driving movement of the actuator 30 cannot damage the vane 45 by striking it against the structure 45.

To sense the rotational position of the turret, four limit switches 120–1, 120–2, 120–3 and 120–4 are mounted on the rear case element 40 of the rotary actuator 30 in the opening 33 of the ram 16. The switches 120 are disposed in angularly spaced relation about the periphery of the rear end of the drive shaft 31 and each switch corresponds to one of the four index positions of the turret 15. The drive shaft 31 projects into the opening 33 and carries a cam 121 having an operating notch 122 at one point in its periphery. It will be seen that the operating notch 122 operates the respective limit switches 120 upon rotary movement of the shaft 31, which, of course, occurs in conjunction with the rotary movement of the turret 15. It will be understood that a suitable control circuit is provided embodying the switches 120 and switches 92, 93 to energize the linear actuator 85 and the rotary actuator 30 in order to unlock and rotate the turret 15 to the desired position. Such a control circuit is disclosed in copending application Serial No. 173,428, filed February 15, 1962, and assigned to the assignee of the present invention.

It may now be appreciated that there is provided a power indexing mechanism for the side turret of a machine tool which is extremely compact and which is readily accommodated within hollow end portions of the supporting ram. The rotary actuator 30 provides direct drive for rotating the turret and has a built-in safety feature since it stalls if the turret is blocked. Moreover, the actuator 30 is practically trouble free and is inexpensively but ruggedly constructed of heavy-duty components. It will also be seen that the detachable tool head 100 which is independent from the indexing and turret clamping mechanism greatly reduces the shut-down time of the machine tool.

Those familiar with this art will appreciate that the mechanism embodied in the ram 16 for indexing the side turret 15 can equally well be adapted for enclosure within the vertical ram 13 for operating an auxiliary turret.

We claim as our invention:

1. In a machine tool, the combination comprising, an elongated hollow ram having a generally rectangular cross section, a turret rotatably mounted on one side of said ram adjacent one end thereof, a supporting head mounting said ram for reciprocal movement between extended and withdrawn positions, said supporting head substantially completely surrounding the three remaining sides of said ram when said ram is in said withdrawn position, a rotary hydraulic actuator enclosed within said one end of said ram and having a drive shaft coupled to said turret, said actuator having a chamber enclosing a driving vane secured to said shaft, structure within said actuator dividing said chamber into separate compartments on either side of said vane, means for selectively admitting hydraulic fluid into each of said compartments for rotating said turret in opposite directions, and said vane having an outer end portion spaced radially inwardly from said chamber to provide running clearance at any rotational position of said vane within said chamber so that said actuator stalls when said turret is blocked against rotation.

2. In a machine tool, the combination comprising a hollow elongated ram, a turret shaft transversely mounted within one end of said ram for rotational movement, a turret base rotatably mounted on said shaft, a rotary actuator disposed within said ram and coupled to said shaft for selectively rotating said base between alternate operating positions, a clamp on said ram for selectively locking said turret base against rotation, a tool holding turret mounted on said shaft outwardly of said base, means interposed between said base and said turret for resisting relative rotation therebetween, and means for detachably interconnecting said shaft and said turret so that the turret together with its tooling can be removed and replaced without disturbing the rotational positions of said actuator, shaft, base and clamp.

3. In a machine tool, the combination comprising, an elongated hollow ram, a turret shaft transversely mounted at one end of said ram for rotational and axial movement, a turret secured to said shaft, a clamp for clamping said turret against rotation on said ram upon axial movement of said shaft in one direction, a linear hydraulic actuator enclosed longitudinally within said hollow ram and coupled to said shaft to impart axial movements thereto for clamping and unclamping said turret, a rotary hydraulic actuator including a driving vane, said rotary hydraulic actuator being enclosed within said hollow ram coaxially with said shaft and coupled thereto, and means for selectively admitting hydraulic fluid to said actuator on opposite sides of said vane to alternately rotate said turret in opposite directions when said turret is unclamped by said linear hydraulic actuator.

References Cited by the Examiner

UNITED STATES PATENTS

| | | | |
|---|---|---|---|
| 431,809 | 7/90 | Hartness | 29—46 |
| 457,967 | 8/91 | Hartness | 29—46 |
| 556,415 | 3/96 | Hartness | 29—35.5 X |
| 728,573 | 5/03 | Hanson | 74—822 |
| 2,384,809 | 9/45 | Bullard et al. | 29—36 |
| 2,883,886 | 4/59 | Brujamin | 74—822 X |
| 2,902,889 | 9/59 | Trechsel | 74—823 |
| 2,936,656 | 5/60 | Conover | 74—826 |
| 2,940,341 | 6/60 | Diener | 74—824 |
| 2,967,463 | 1/61 | Jensen | 90—13.5 |
| 3,101,013 | 8/63 | Ayers | 74—818 |
| 3,120,134 | 2/64 | Sweeney | 74—823 |

BROUGHTON G. DURHAM, *Primary Examiner.*

WILLIAM W. DYER, JR., *Examiner.*